Nov. 25, 1947.　　　S. J. CHERRY ET AL　　　2,431,368
METHOD OF ELECTRIC ARC BRAZING
Filed April 13, 1943
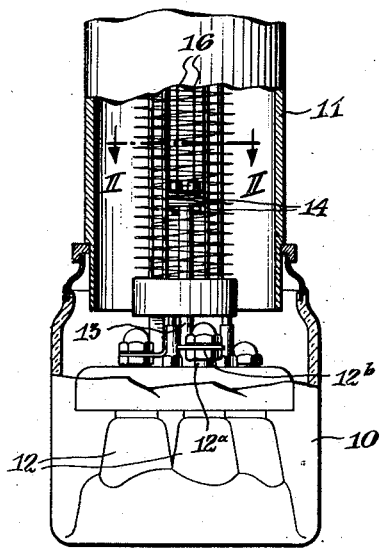
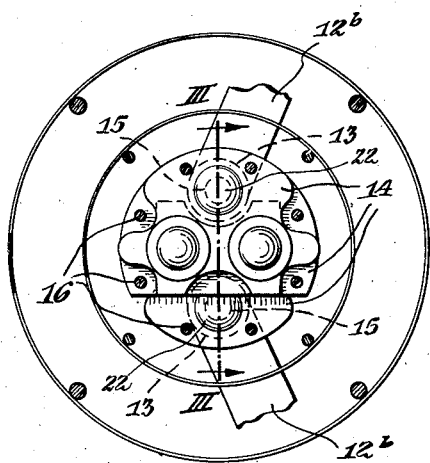
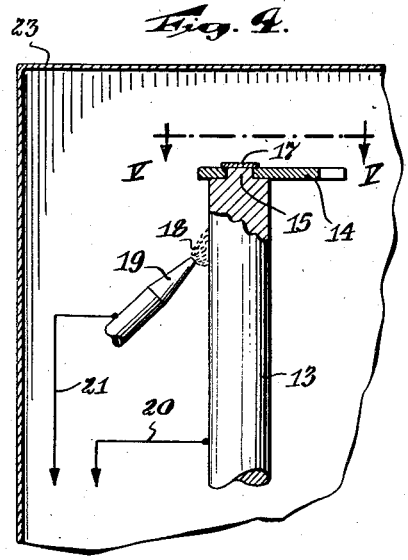
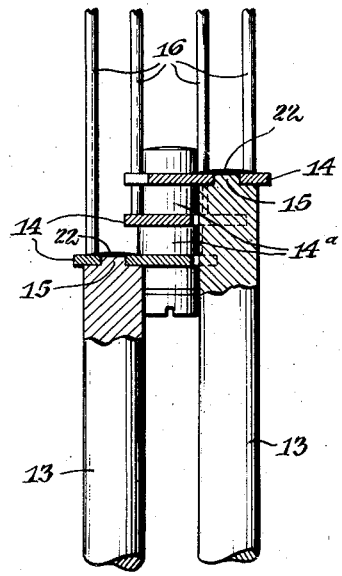
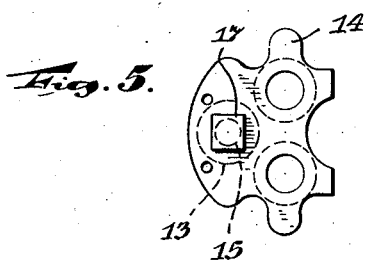
INVENTORS
S. J. CHERRY
L. C. WERNER
BY
ATTORNEY Patented Nov. 25, 1947

2,431,368

UNITED STATES PATENT OFFICE 2,431,368

METHOD OF ELECTRIC ARC BRAZING

Sidney J. Cherry, East Orange, and Leo C. Werner, Bloomfield, N. J., assignors to Westinghouse Electric Corporation, East Pittsburgh, Pa., a corporation of Pennsylvania Application April 13, 1943, Serial No. 482,856

3 Claims. (Cl. 219—12)

This invention relates in general to an improved method of mounting electrodes in electron discharge devices of the character illustrated in application, Serial No. 413,168, filed October 1, 1941 (now Patent No. 2,398,608, dated April 16, 1946), by L. C. Werner and H. J. Dailey, and assigned to the same assignee as the present case.

According to the previously filed application above mentioned, electrode strands have had their lower ends attached to a series of parallel plates situated perpendicular to the strands and the plates in turn have been supported from below by a plurality of posts carried by the envelope base. Difficulty has been experienced in obtaining a satisfactory, rigid and permanent connection between the posts and plates. In use, the plates, particularly those to which the filaments are secured, become very hot as a result of which the silver or copper brazing connection having a melting point of perhaps 1000° C. to 1050° C. would soften or melt, rendering the entire device useless. To follow former brazing procedure but with a brazing material of higher melting temperature would necessitate subjecting the filament and other parts of the tube to temperatures so high as to be detrimental thereto. The limitation of temperature to avoid injury to parts, such as the emissive surface of the filament, and the degree of temperature needed for obtaining a more stable braze left no latitude for performance of the work by known brazing methods.

In its general aspects, therefore, the invention contemplates the solution of the above-outlined problem.

More specifically, the invention provides a novel method of brazing or uniting parts.

Likewise, an object of the invention is to secure a brazed connection with adequate heat to the parts being joined but with minimum heat applied to nearby parts.

A further object of the invention is to enable a braze to be effected in proximity to a part which would be injured by being subjected to the brazing heat but with the braze safely brought to such brazing temperature.

Again, an object of the invention is to enable a braze to be made with a metal of high melting point, namely, above 1050° C., in an electron discharge device.

Specifically, an object of the invention is to secure a molybdenum post to a molybdenum plate with a nickel braze without injury to filament, grid or other parts in proximity to the brazed connection.

Still further objects of the invention will appear as the description proceeds, both by direct recitation thereof and by implication from the context.

Referring to the accompanying drawing in which like numerals of reference indicate similar parts throughout the several views;

Figure 1 is an elevational-sectional view of an electron discharge device embodying our invention;

Figure 2 is a cross-sectional view on line II—II of Fig. 1;

Figure 3 is a longitudinal section on line III—III of Fig. 2;

Figure 4 is a view similar to a part of Fig. 3 showing an example of the fabrication method; and Figure 5 is a plan of the plate to which the post of Fig. 4 is being brazed, viewed as on line V—V of Fig. 4.

In the specific embodiment of the invention illustrated in said drawing, a part of an electron discharge device, generally identified as a transmitting tube, is depicted exemplifying the invention accomplished therein. It should be understood, however, at the outset, that the invention is applicable to other electronic devices than the particular transmitting tube here selected for illustrative purposes.

The particular tube shown comprises a glass or other ceramic bowl or base portion 10, here represented as forming part of an evacuated envelope, and to a rim of said base 10 is suitably sealed a tubular metallic anode 11 which also forms part of the evacuated envelope. The base is shown having a plurality of re-entrant stems 12 each supporting a rigid metallic lead-in rod 12$^a$ to two of which rigid lateral arms 12$^b$ are secured and which extend inwardly toward each other beneath the filament. At the inner ends of these arms are attached two posts 13 which are parallel and project upwardly within the envelope. At the top of the posts 13 are three transverse plates 14, the upper one of which is mounted on the end of one post, the lower one on the other post and the intermediate one is supported with intervening insulating spacers 14a by and between the two first mentioned or top and bottom plates 14. Attachment of the top and bottom plates 14 may therefore be effected at the tops of the respective posts 13, as by forming, in each instance, a reduced neck 15 on the end of the post to project through a corresponding hole therefor in the plate.

Projecting upwardly from the plates are strands 16 constituting, in the showing of Fig. 3, the filament or cathode, and representative of use of said plates for support and attachment of electrodes in general. The electrode strands are secured to the plates by brazing or the like, and it is therefore necessary to avoid injury either to the electrode or to the braze of the electrode to plates when securing the posts to the plates especially in view of the proximity of one to the other.

In practice, the posts 13 and plates 14 are of molybdenum, but other metals, such as tungsten, tantalum, etc., of high melting point may be employed for either or both. The present invention is directed to the attachment or brazing of the posts to the plates at their junction avoiding injury to the electrode and its brazed attachment to the plate, notwithstanding proximity thereof to the junction of post and plate being brazed, and yet using a braze requiring high temperature for effectuating the same. The preferred material for making the braze is nickel, melting temperature for which is approximately 1452° C. and as the filament temperature in use is approximately at least 450° C. lower, the resultant safety factor for permanence of the braze is ample.

For performing the braze between the plates and the posts, those parts are mounted temporarily in suitable fixtures (not shown) to align, hold and properly position those parts during the brazing operation. Suffice it to say, the plates rest on the upper ends of the posts with the necks 15 projecting through the holes in the plates provided for the purpose. A piece of brazing material 17 having an area of about the cross-section of the post is laid over the end of the post neck, as shown in Figs. 4 and 5. While this brazing piece 17 is preferably nickel, other metals or alloys having adequately high melting temperature but less than that of the posts and plates, may be used.

After the brazing material is placed, as indicated, a welding arc 18 is struck from a welding electrode 19 preferably to the post in proximity to the junction of plate and post and below the plate, protecting the tube electrode from radiant heat. Electric current for the arc is applied through appropriate circuit, one line 20 being shown as connected to the post and the other line 21 to the welding electrode. Heat conduction in the post from the arc to the brazing piece melts the said brazing piece so that part of the melted material enters the crevices between the post and plate including the crevice between the neck of the post and the plate. The brazing material thus securely binds the parts together with excess material forming a rivet like head 22 over the neck and margin of the plate around said neck. Due to the area and thin character of the plate, heat of conduction transmitted thereto rapidly dissipates within a short distance from the joint so that no injury to the filament or its connection to the plate will result. Conversely, the mass of the post enables a large part of the heat from the arc to travel to and be effective upon the brazing piece. The heat is thus concentrated and minimized in effect upon other parts in the vicinity.

The use of an electric welding electrode enables the arc to be formed close to the proposed joint notwithstanding inaccessibility for larger tools within the limited space for operation. If desired, the brazing may be performed within an enclosure 23 containing hydrogen or other gas having no ill effect upon the heated metals, and thus avoiding oxidation or other chemical reactions likely to occur when metals are heated to high temperatures in air. The present invention not only produces a joint of a character resistive to deterioration from operating temperatures of the tube, but enables a joint to be completed approximately in a minute which, by previous methods and materials, required close to fifteen minutes to perform.

While, for purposes of describing the invention with relation to a specific embodiment, reference has been made to definite temperatures, materials, electrodes and other parts, it is to be understood that such has been done by way of exemplification and not for restricting the invention thereto except as particularly recited in the appended claims.

We claim:

1. A fabrication method for electron discharge devices comprising assembling metallic parts to be secured at a junction therebetween, applying a brazing material next the junction between said parts, applying a source of electrical current to one of said parts at a distance from said junction, striking an electrical arc to said one part clear of the junction but in the vicinity thereof and between said junction and said application of the source of current, whereby the arc-forming current cannot traverse the junction, and melting said brazing material by heat of conduction traveling in the part to which the arc is applied and from the arc to the junction.

2. A fabrication method for electron discharge devices comprising assembling metallic parts to be secured at a junction therebetween, one of said parts having greater cross-sectional area at the junction than the other, applying a brazing material next the junction between said parts, applying a source of electrical current to said one of said parts with the greater cross-sectional area at a distance from said junction, striking an electric arc to said one part clear of the junction but in the vicinity thereof and between said junction and said application of the source of current, whereby the arc-forming current cannot traverse the junction and the said one part is subjected to higher temperature than the other, and melting said brazing material by heat of conduction traveling in the part to which the arc is applied and from the arc to the junction.

3. A fabrication method for electron discharge devices comprising assembling a post to a flat member to project from said member transversely thereof, said member being relatively thin in comparison to the diameter of the post at the junction therebetween, applying a brazing material next the said junction, applying a source of electric current to said post at a distance from said junction, striking an arc to said post clear of the junction but in the vicinity thereof and between said junction and said application of the source of current, whereby the arc-forming current cannot traverse the junction and said post is subjected to higher temperature than said member, and melting said brazing material by heat of conduction traveling in the said post to the junction.

SIDNEY J. CHERRY.
LEO C. WERNER.

REFERENCES CITED

The following references are of record in the file of this patent:

UNITED STATES PATENTS

| Number | Name | Date |
| --- | --- | --- |
| 1,022,553 | Howell | Apr. 9, 1912 |
| 1,367,796 | Cadwell | Feb. 8, 1921 |
| 1,559,415 | Fuller | Oct. 27, 1925 |
| 1,695,791 | Yunck | Dec. 18, 1928 |
| 2,023,931 | McCullough | Dec. 10, 1935 |
| 2,070,968 | Bull | Feb. 16, 1937 |
| 2,118,765 | Miller | May 24, 1938 |
| 2,151,334 | Rockefeller | Mar. 21, 1939 |
| 2,269,845 | Dailey | Jan. 13, 1942 |
| 2,287,178 | Johnston | June 23, 1942 |